United States Patent [19]

Green et al.

[11] 4,378,465
[45] Mar. 29, 1983

[54] APPARATUS FOR GENERATING A SIGNAL REPRESENTATIVE OF A CO-ORDINATE POSITION OF A MOVABLE INDICATING MEMBER

[75] Inventors: David J. Green, Blagdon; John A. Gordon, Hatfield; David Edge, Bristol, all of England

[73] Assignee: Image Data Products Limited, England

[21] Appl. No.: 201,833

[22] Filed: Oct. 29, 1980

[30] Foreign Application Priority Data

Nov. 7, 1979 [GB] United Kingdom ............. 7938546

[51] Int. Cl.³ .................... H04N 1/00; G08C 21/00
[52] U.S. Cl. ............................................ 178/19
[58] Field of Search ................. 178/19, 18; 33/1 M; 340/146.3 SY; 364/520

[56] References Cited

U.S. PATENT DOCUMENTS

| | | | |
|---|---|---|---|
| 3,466,646 | 9/1969 | Lewin | 178/19 |
| 3,819,857 | 6/1974 | Inokuchi | 178/19 |
| 4,029,899 | 6/1977 | Gordon | 178/19 |

FOREIGN PATENT DOCUMENTS

| | | |
|---|---|---|
| 592918 | 11/1977 | Switzerland . |
| 1222342 | 2/1971 | United Kingdom . |
| 1306040 | 2/1973 | United Kingdom . |
| 1348866 | 3/1974 | United Kingdom . |

OTHER PUBLICATIONS

"Inductive Transducers for Graphical Input Devices", by Ivaslchertzo et al, *Soviet Inst'n. and Control*, No. 8, Aug. 1969.

*Primary Examiner*—Thomas A. Robinson
*Attorney, Agent, or Firm*—Larson and Taylor

[57] ABSTRACT

Apparatus is disclosed for generating a signal representative of a co-ordinate position of a movable indicating member, the member being constructed for interacting magnetically with sensing coils. The apparatus includes a plurality of sensing coils (2 to 11) for interacting magnetically with such a member, the coils being positioned substantially in or adjacent to a real or imaginary surface in or adjacent to which such an indicating member may be moved, the sensing coils being positioned to divide an area of interest in the surface into regions, each of the coils encircling part of the area of interest and having conductors in the area substantially along region boundaries only, each of the regions being within an arrangement of the sensing coils particular to that region. A further coil (1) is positioned substantially in or adjacent to the real or imaginary surface and surrounds the entire area of interest. There are a first one (2) and a second one (3) of the sensing coils which have conductors at substantially the same pitch but which coils are offset relative to each other. Processing means (16, D2 to D11, 17, G2 to G11 and L1 to L9) includes an exclusive-OR gate (15), an output of each of the first and second ones of the sensing coils being coupled only to a respective input of this gate. The processing means uses the output signal of the exclusive-OR gate and other signals derived from the sensing coils with reference to the signal in the further coil to produce a binary coded signal representative of a co-ordinate position of such a member.

12 Claims, 15 Drawing Figures

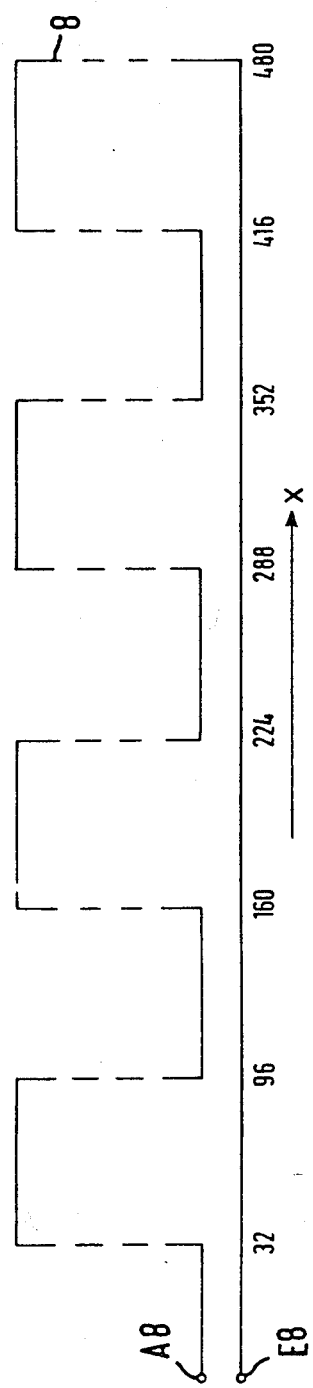
FIG. 1(h)
FIG. 1(i)
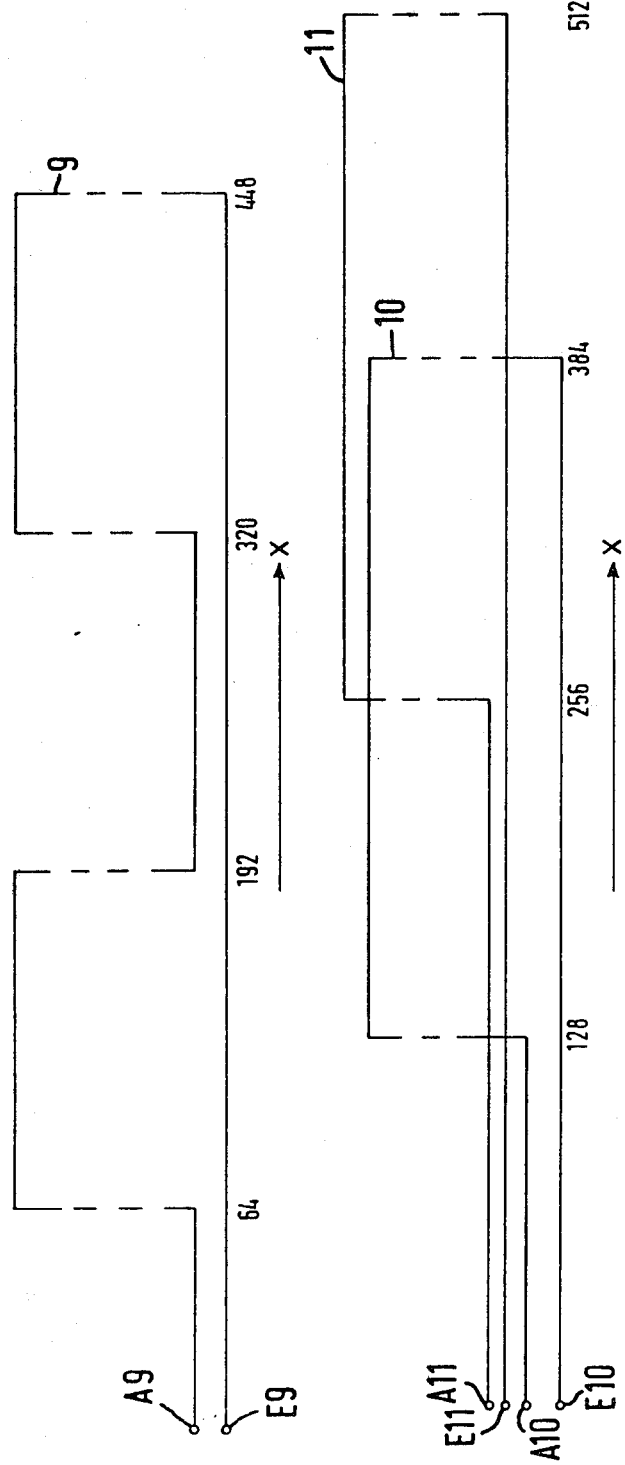
FIG. 1(j)

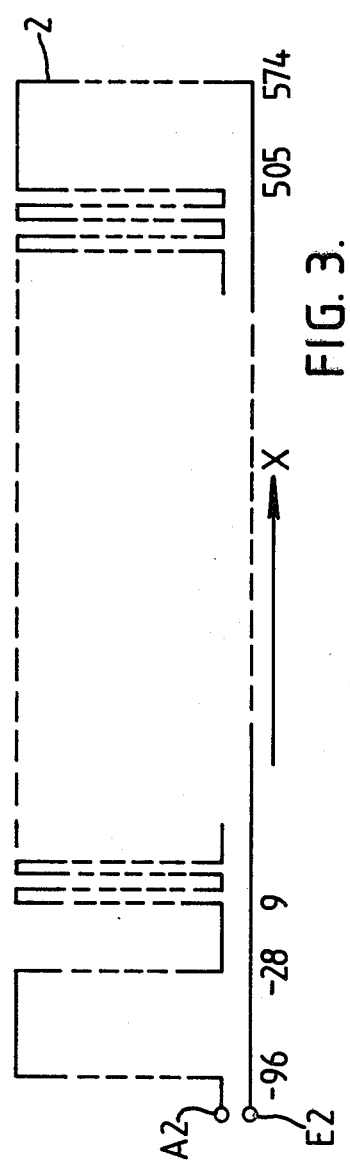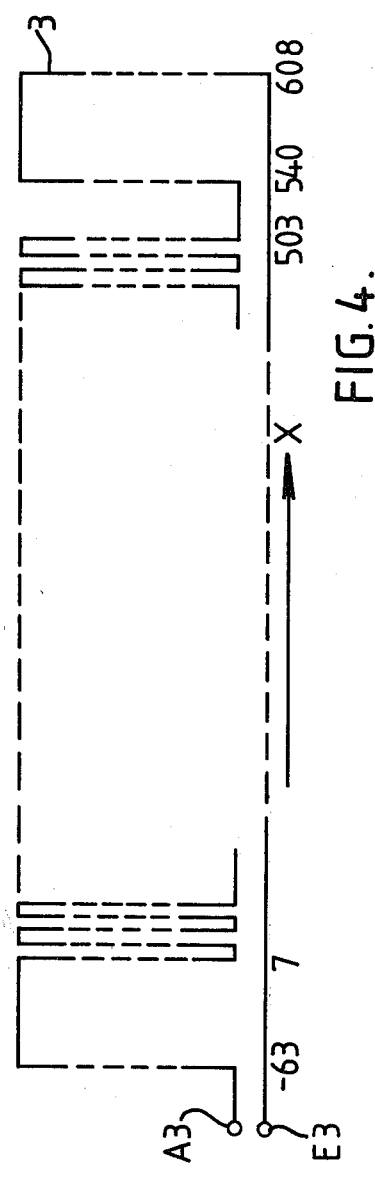

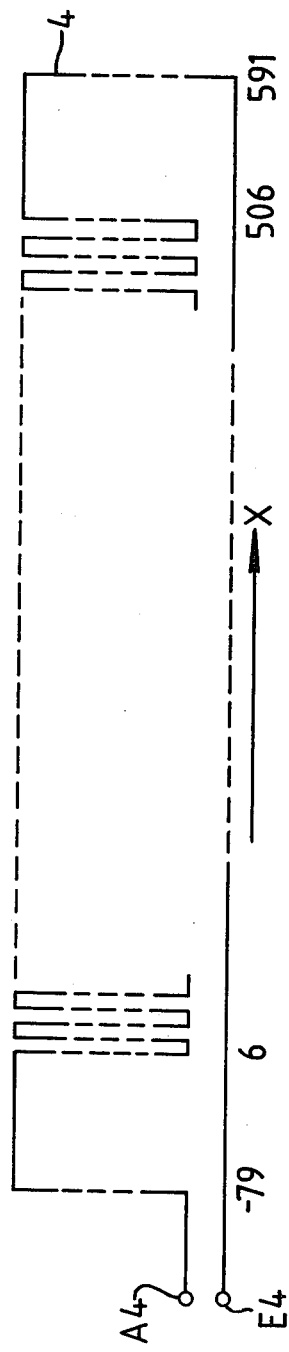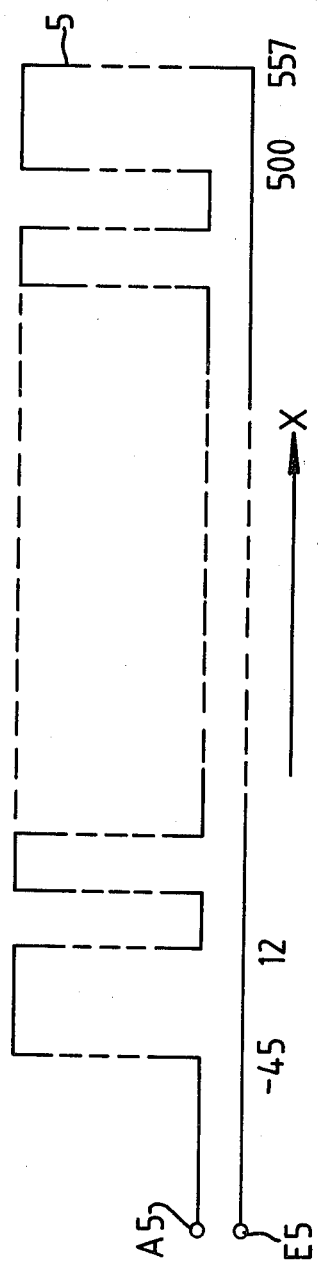
FIG. 5.
FIG. 6.

4,378,465

APPARATUS FOR GENERATING A SIGNAL REPRESENTATIVE OF A CO-ORDINATE POSITION OF A MOVABLE INDICATING MEMBER

Apparatus for generating a signal representative of a co-ordinate position of an indicating member is disclosed in British Patent Specification No. 1,528,578.

According to the present invention, there is provided apparatus for generating a signal representative of a co-ordinate position of a movable indicating member, the member being constructed for interacting magnetically with sensing coils, the apparatus including:

(a) a plurality of sensing coils for interacting magnetically with such a member, the coils being positioned substantially in or adjacent to a real or imaginary surface in or adjacent to which such an indicating member may be moved, the sensing coils being positioned to divide an area of interest in the surface into regions, each of the coils encircling part of the area of interest and having conductors in the said area substantially along region boundaries only, each of the regions being within an arrangement of the sensing coils particular to that region; and (b) means for processing signals from the sensing coils to produce a signal representative of a co-ordinate position of such an indicating member, in which apparatus:

(c) there are a first one and a second one of the said sensing coils which have conductors at substantially the same pitch but which coils are offset relative to each other; and (d) the processing means includes an exclusive-OR gate, an output of each of the said first and second ones of the sensing coils being coupled only to a respective input of this gate whereby a signal at an output of this gate is that which would appear from a single sensing coil having conductors at a smaller pitch than the conductors of each of the said first and second ones of the sensing coils, in use of the apparatus the signal at the output of the exclusive-OR gate being one of the signals processed by the processing means to produce a signal representative of a co-ordinate position of such a member.

Preferably, the said first one of the sensing coils is offset relative to the said second one of the sensing coils by substantially half the pitch of its said conductors, whereby the signal at the output of the exclusive-OR gate is that which would be produced by a single sensing coil having conductors at substantially half the pitch of the conductors of each of the said first and second ones of the sensing coils.

The apparatus could include a further coil, positioned substantially in or adjacent the said real or imaginary surface and surrounding the entire area of interest, for co-operating magnetically with such a member, the processing means being arranged for deriving signals from the sensing coils with reference to a signal in the further coil and processing the derived signals to produce a signal representative of a co-ordinate position of such a member. In this case, the processing means could include means for combining, for example in a subtractive manner, a signal derived from a fraction, for example half, of a signal in the further coil with a signal derived each of the sensing coils. In this case, the combining means could comprise, for each of the sensing coils respective detecting means having an input coupled to an end of the sensing coil for detecting the signal in the coil, and another input connected to an output of amplifying means for receiving the said fraction, in the case of each of the said first and second ones of the sensing coils, the said end being the said output of the coil, an output of the respective detecting means being coupled to the respective input of the exclusive-OR gate. Such apparatus could be designed to co-operate with an indicating member, for example a writing implement for writing on a writing surface (such as a sheet of paper) laid over the real or imaginary surface and including a coil electrically energised to produce magnetic flux for interacting with the sensing coils and the further coil. The coil of the indicating member could be energised by an electrical signal comprising pulses at a certain frequency, the processing means of the apparatus including a plurality of latching means operated in use at the frequency of the pulses and receiving signals derived from the detecting means, one of the latching means being coupled to the output of the exclusive-OR gate. There could be respective amplifying means coupled to the output of each of the detecting means, in the case of each of the detecting means coupled to the said outputs of the said first and second ones of the sensing coils, the amplifying means being coupled between the output of the detecting means and the respective input of the exclusive-OR gate.

The sensing coils of apparatus according to the present invention could coomprise a first set of sensing coils, there being a second set of such sensing coils orthogonal to the first sensing coils and further such processing means, for processing signals from the second set of sensing coils, so that signals representative of co-ordinate positions of such an indicating member in two orthogonal co-ordinate directions can be produced by the first-mentioned and further processing means respectively.

The distance between adjacent conductors of at least some of the sensing coils, or at least one of the sets of sensing coils, could be greater near edges of the area of interest than elsewhere.

Apparatus according to the present invention could be used in the recognition of hand-written characters or other graphical or numerical data, an appropriately programmed computer being connected with the or each processing means for receiving co-ordinate position representative signals therefrom.

the present invention will now be described by way of example with reference to the accompanying drawings, in which:

FIGS. 1a to 1j show the shapes of various coils in the apparatus;

FIGS. 3 to 6 show, for a particular example, alternative shapes for four of the coils of FIGS. 1(a) to 1(j).

Figure 1A:
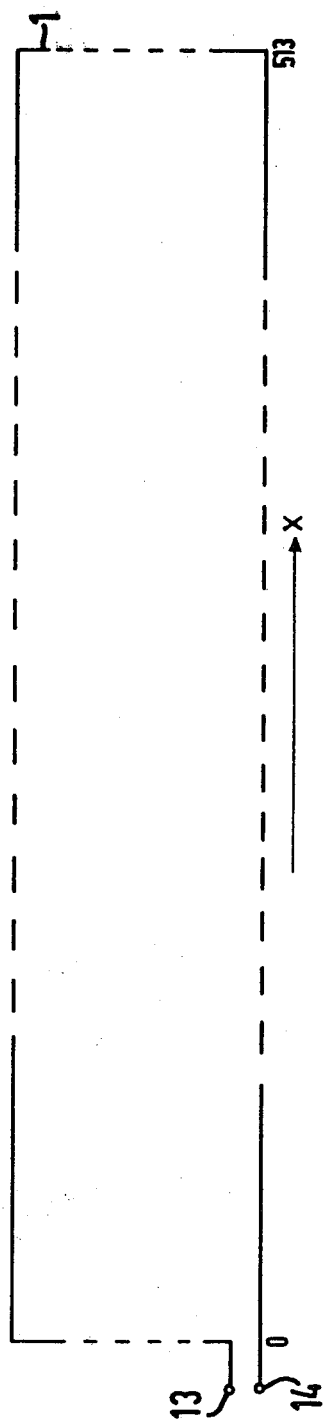

In the apparatus to be described, there are eleven coils for use in deriving a signal representative of a co-ordinate position in a first co-ordinate direction (the X-direction) of a writing implement carrying a coil which is electrically energised to produce a magnetic flux. The coils are produced in the manner of a double-sided printed circuit board on a substrate having metal on two opposite faces, by etching away metal from these faces so that conductors of the coil extending in the X-direction are on one face and conductors of the coils extending in the orthogonal direction (the Y-direction) are on the opposite face, appropriate through-connections being effected to complete the coils. Assuming measurement in the X-direction from a position O in terms of a nominal unit of distance, then the coils are as follows:

There is an outer coil 1 having conductors extending in the Y-direction at distances of 0 and 513 along the X-direction (see FIG. 1a).

Figure 1B:
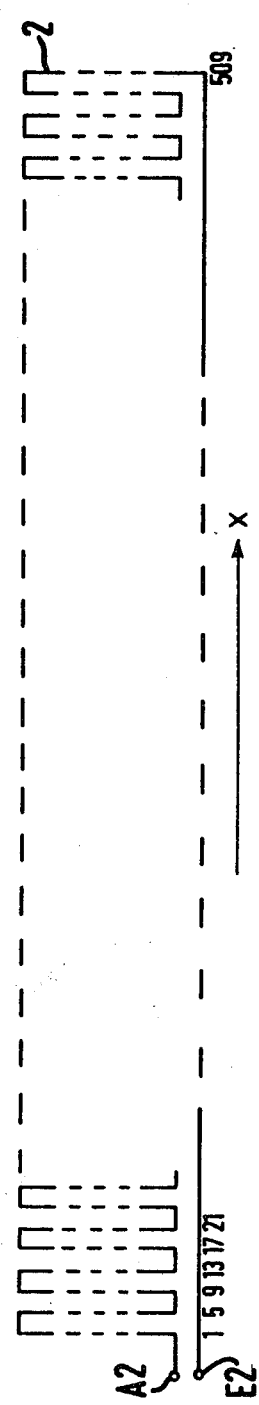

There is a coil 2 having conductors extending in the Y-direction at distances 1,5,9,13 . . . 501, 505 and 509 along the X-direction (see FIG. 1b).

Figure 1C:
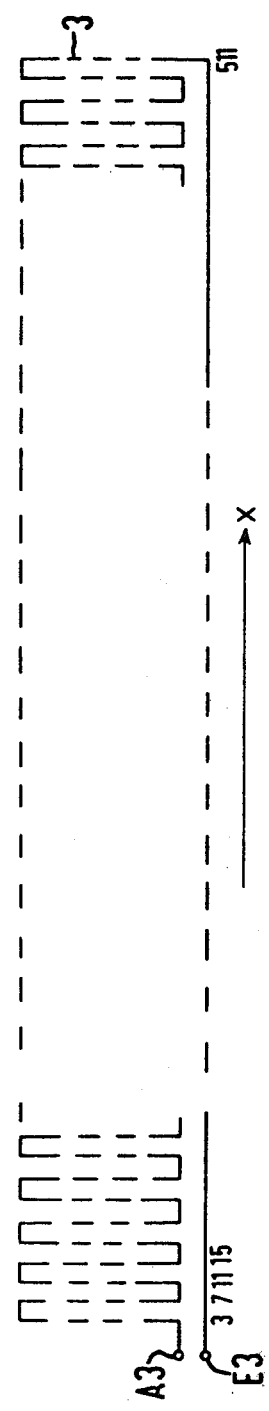

There is a coil 3 having conductors extending in the Y-direction at distances 3,7,11,15 . . . 503,507 and 511 along the X-direction (see FIG. 1c).

Figure 1D:
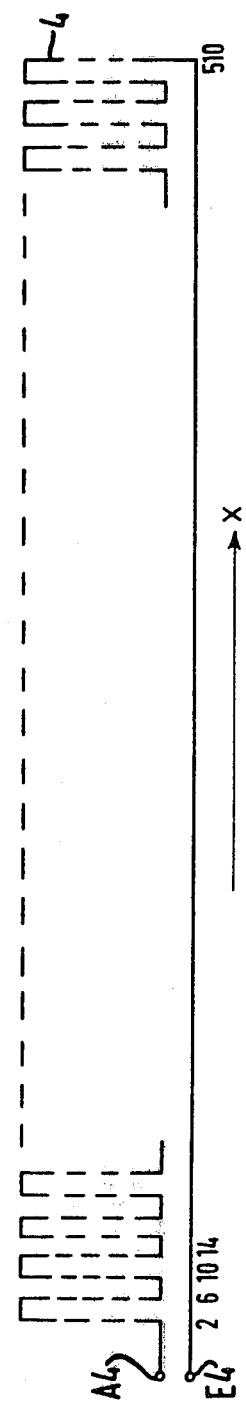

There is a coil 4 having conductors extending in the Y-direction at distances 2,6,10,14 . . . 502,506 and 510 (see FIG. 1d).

Figure 1E:
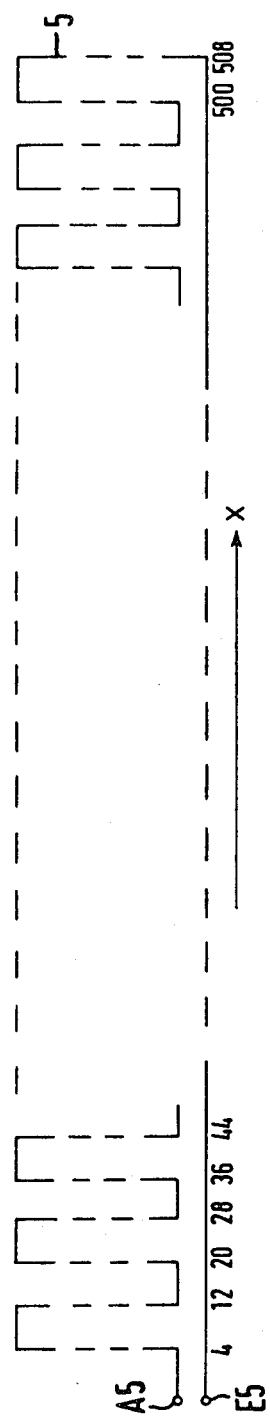

There is a coil 5 having conductors extending in the Y-direction at distances 4,12,20 . . . 492,500 and 508 along the X-direction (see FIG. 1e).

Figure 1F:
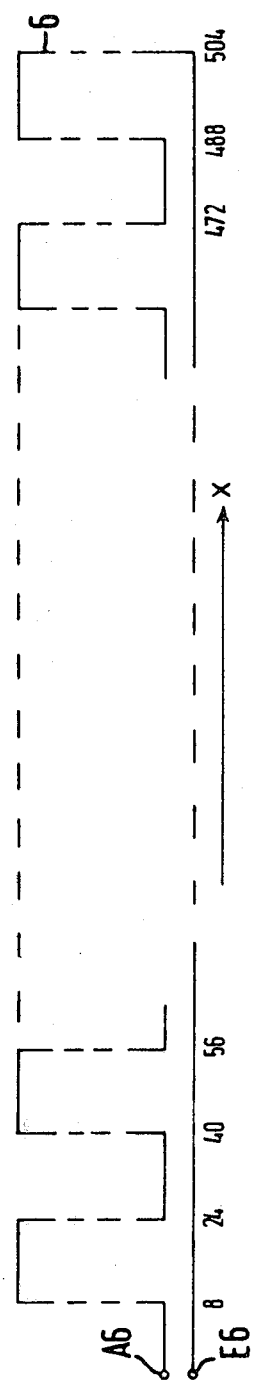

There is a coil 6 having conductors extending in the Y-direction at distances 8,24,40 . . . 472,488 and 504 along the X-direction (see FIG. 1f).

Figure 1G:
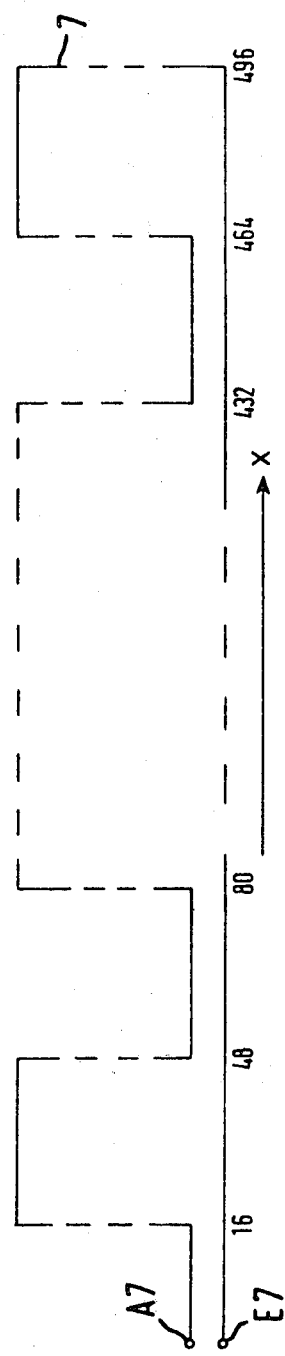

There is a coil 7 having conductors extending in the Y-direction at distances 16,48,80 . . . 432,464 and 496 along the X-direction (see FIG. 1g).

There is a coil 8 having conductors extending in the Y-direction at distances 32,96,160 . . . 352,416 and 480 along the X-direction (see FIG. 1h).

There is a coil 9 having conductors extending in the Y-direction at distances 64,192,320 and 448 along the X-direction (see FIG. 1i).

There is a coil 10 having conductors extending in the Y-direction at distances 128 and 384 along the X-direction and there is a coil 11 having conductors extending in the Y-direction at distances 256 and 512 along the X-direction (see FIG. 1j).

For the sake of clarity and ease of illustration, FIGS. 1a to 1g have been drawn to a different scale from FIGS 1h to 1j. It will be appreciated that coils 2,3 and 4 have conductors at the same pitch, namely 4 nominal distance units, and coils 5,6,7,8,9,10 and 11 have conductors at pitches 8,16,32,64,128, 256 and 256 respectively in terms of the nominal distance unit. All the coils 2 to 11 are disposed within the outer coil 1. Also, it will be appreciated that there are no two conductors extending in the Y-direction at the same distance along the X-direction. The conductors extending in the X-direction are all at different distances along the Y-direction.

Figure 2:
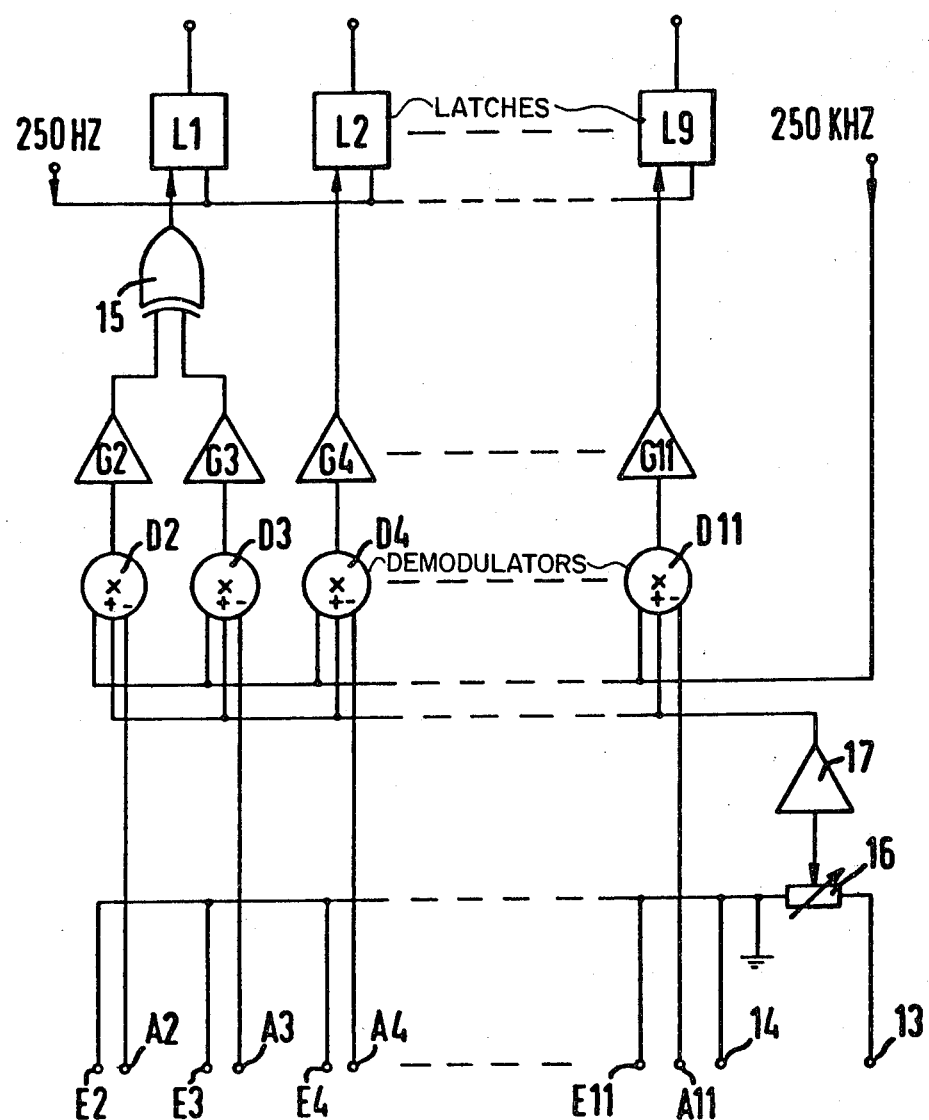
FIG. 2 is a circuit diagram showing how the coils are connected with processing means.

The apparatus is intended to be used with a writing implement which includes a coil electrically energised to produce a magnetic flux for co-operating with the coils, the substrate carrying the coils being underneath a surface on which a sheet of paper may be laid. The coil of the implement is energised by an electrical signal which comprises a carrier of 250 kHz modulated by pulses at a frequency of 250 Hz. Assuming the implement is placed on the paper laid on to the surface above the coils, and the coil of the implement is energised, the signal induced in each of the sensing coils 2 to 11 is dependent on whether the coil of the implement is in or out of the sensing coil so that the combination of induced signals uniquely defines the co-ordinate position of the implement in the X-direction. Processing means associated with the coils 1 to 11 will now be described, for producing a binary coded signal representative of the co-ordinate position of the implement in the X-direction using the induced signals in the coils 1 to 11, with reference to FIG. 2.

The end 14 of the coil 1 and the ends E2, E3 . . . E11 of the coils 2 to 11 are electrically connected together and to earth. A potentiometer 16 is connected between the ends 13 and 14 of the coil 1 and from it is tapped half the signal induced in the coil 1, which is applied to the input of a common emitter amplifier 17. The output of the amplifier 17 is connected to a non-inverting input of each of demodulators D2, D3 . . . D11. The other ends A2, A3 . . . A11 of the coils 2 to 11 are connected to inverting inputs of respective ones of the demodulators D2, D3 . . . D11 so that an amplified version of half the signal in the coil 1 is combined in a subtractive manner with the signals induced in the coils 2,3 . . . 11 in the demodulators D2, D3 . . . D11 respectively. the outputs of the demodulators are connected to the inputs of respective amplifiers G2, G3 . . . G11. Each of the amplifiers acts as a zero reference comparator. Each of the demodulators is operated by a demodulating signal of 250 kHz. The phase of the output signal of each of amplifiers G2, G3 . . . G11 is dependent on whether the coil of the writing implement is in or out of the associated sensing coil, so that the particular combination of phases uniquely defines the co-ordinate position of the writing implement in the X-direction. The outputs of the amplifiers G2 and G3 are connected to respective inputs of an exclusive-OR gate 15, the result being that the signal appearing at the output of the gate 15 is that which would appear if, instead of the coils 2 and 3, a single coil was used having half the pitch of the conductors extending in the Y-direction of each of the coils 2 and 3. This technique provides a sensitivity corresponding to that which would be ontained using a sensing coil having conductors extending in the Y-direction whose pitch is half that of the corresponding conductors of each of the coils 2 and 3, but avoids actually using such a coil, which might not be possible having regard to the physical dimensions of the writing implement being used.

The output of the gate 15 and the outputs of the amplifiers G4, G5 . . . G11 are connected to the inputs of respective latches L1, L2 . . . L9 each of which is operated at 250 Hz. The set of output signals from the latches in response to any particular sampling is a binary coded signal uniquely defining the co-ordinate position of the implement in the X-direction. The sequence of binary coded signals can be fed to a suitably programmed computer for identifying characters written by the implement.

The substrate carrying the sensing coils 2 to 11 and the outer coil 1 is on one side of an electrically insulating plate, on the other side of which is an identical arrangement of sensing coils and an outer coil, orthogonally disposed relative to the sensing coils 2 to 11 and the outer coil 1 and connected and provided with processing means in the manner described above, for producing binary coded signals uniquely defining co-ordinate positions of the implement in the Y-direction.

In a particular form of apparatus as described above, the coils for use in producing binary coded signals defining co-ordinate positions of the implement in the X-direction actually may differ from the coils orthogonally disposed, in that there is a greater distance respectively between the first two and the last two of the conductors extending in the Y-direction of each of the coils 2,3,4 and 5, the conductors extending in the Y-direction therebetween being at the same distances in the X-direction in terms of the nominal distance unit as described above but the coils 1,2,3,4 and 5 starting and finishing to the left and right respectively of distances 0 and 513. In particular, the first and last conductors extending in the Y-direction of the coil 1 are at distances -113 and 642 along the X-direction; the first, second, last but one and last of the conductors extending in the Y-direction of the coil 2 are at distances −96, −28, 505 and 574 along the X-direction (see FIG. 3); the first, second, last but one and last of the conductors extending in the Y-direction of the coil 3 are at distances −63, 7, 540 and 608 along the X-direction (see FIG. 4); the first, second, last but one and last of the conductors extending in the Y-direction of the coil 4 are at distances −79, 6, 506 and 591 along the X-direction (see FIG. 5); and the first, second, last but one and last of the conductors extending in the Y-direction of the coil 5 are at distances −45, 12, 500 and 557 along the X-direction (see FIG. 6). Also, the second conductor extending in the Y-direction of the coil 11 is at distance 625 along the X-axis. This is so that regions defined by coils 2,3,4 and 5 are provided at the beginning and end respectively of the set of coils with which the writing implement may co-operate for different functions, for example to send correction signals to the computer or to use the coomputer for carrying out calculations, regions being on the surface under which the coils are disposed which are appropriately marked to show where the implement should be placed. From the second to the last but one of the conductors extending in the Y-direction of the coil 4, there is a distance of about 300 mm, the various conductors of the coils extending in the Y-direction having a pitch of 0.584 mm (this being the nominal distance unit) and the set of coils extends in the Y-direction by about 300 mm; and the pitch of the various conductors extending in the X-direction of the orthogonally disposed coils for use in producing binary coded signals defining co-ordinate positions of the implement in the Y-direction is 0.584 mm, this set of coils being about 300 mm by 300 mm in size and overlying the area between the said second and last but one of the conductors extending in the Y-direction of the coil 4. The result is that the apparatus enables a sheet of A4 writing paper to be placed over the coils (between the said second and last but one of the conductors extending in the Y-direction of the coil 4) so that characters written on it can be recognised.

It will be appreciated that, in apparatus according to the present invention, there could be more than one pair of sensing coils having conductors at substantially the same pitch which coils are offset relative to each other, an output of each of such pair of sensing coils being coupled only to a respective input of an exclusive-OR gate associated with the pair of coils respectively.

We claim:

1. Apparatus for generating a signal representative of a co-ordinate position of a movable indicating member, the member being constructed for interacting magnetically with sensing coils, the apparatus including:
   (a) a plurality of sensing coils for interacting magnetically with such a member, the coils being positioned substantially in or adjacent to a real or imaginary surface in or adjacent to which such an indicating member may be moved, the sensing coils being positioned to divide an area of interest in the surface into regions, each of the coils encircling part of the area of interest and having conductors in the said area substantially along region boundaries only, each of the regions being within an arrangement of the sensing coils particular to that region; and
   (b) means for processing signals from the sensing coils to produce a signal representative of a co-ordinate position of such an indicating member, in which apparatus:
   (c) there are a first one and a second one of the said sensing coils which have conductors at substantially the same pitch but which coils are offset relative to each other; and
   (d) the processing means includes an exclusive-OR gate, an output of each of the said first and second ones of the sensing coils being coupled only to a respective input of this gate whereby a signal at an output of this gate is that which would appear from a single sensing coil having conductors at a smaller pitch than the conductors of each of the said first and second ones of the sensing coils, in use of the apparatus the signal at the output of the exclusive-OR gate being one of the signals processed by the processing means to produce a signal representative of a co-ordinate position of such a member.

2. Apparatus according to claim 1, wherein the said first one of the sensing coils is offset relative to the said second one of the sensing coils by substantially half the pitch of its said conductors, whereby the signal at the output of the exclusive-OR gate is that which would be produced by a single sensing coil having conductors at substantially half the pitch of the conductors of each of the said first and second ones of the sensing coils.

3. Apparatus according to claim 1, including a further coil, positioned substantially in or adjacent to the said real or imaginary surface and surrounding the entire area of interest, for co-operating magnetically with such a member, the processing means being arranged for deriving signals from the sensing coils with reference to a signal in the further coil and processing the derived signals to produce a signal representative of a co-ordinate position of such a member.

4. Apparatus according to claim 3, wherein the said processing means includes means for combining a signal derived from a fraction of a signal in the further coil with a signal derived from each of the sensing coils.

5. Apparatus according to claim 4, wherein the said fraction is a half.

6. Apparatus according to claim 4, wherein the said combining means is arranged for combining the said signal derived from a fraction of the signal in the further coil with the signals derived from the sensing coils in a subtractive manner.

7. Apparatus according to claim 6, wherein the combining means comprises, for each of the sensing coils, respective detecting means having an input coupled to an end of the sensing coil for detecting the signal in the coil, and another input connected to an output of amplifying means for receiving the said fraction, in the case of each of the said first and second ones of the sensing coils, the said end being the said output of the coil, an output of the respective detecting means being coupled to the respective input of the exclusive-OR gate.

8. Apparatus according to claim 7, wherein each of the detecting means comprises a demodulator.

9. Apparatus according to claim 7 or 8, wherein the processing means includes a plurality of latching means operated in use at a certain frequency and connected for receiving signals derived from the detecting means, one of the latching means being coupled to the output of the exclusive-OR gate.

10. Apparatus according to claim 7 or 8, wherein the processing means includes respective amplifying means coupled to the output of each of the detecting means, in the case of each of the detecting means coupled to the said outputs of the said first and second ones of the sensing coils, the amplifying means being coupled between the output of the detecting means and the respective input of the exclusive-OR gate.

11. Apparatus according to claim 1, wherein the sensing coils comprise a first set of sensing coils, there being a second set of such sensing coils orthogonal to the first sensing coils and further such processing means, for processing signals from the second set of sensing coils, so that signals representative of co-ordinate positions of such an indicating member in two orthogonal co-ordinate directions can be produced by the first-mentioned and further processing means respectively.

12. Apparatus according to claim 1, wherein the distance between adjacent conductors of at least some of the sensing coils, or at least one of the sets of the sensing coils, is greater near edges of the area of interest than elsewhere.

* * * * *